Patented May 5, 1925.

1,536,711

UNITED STATES PATENT OFFICE.

HANS HAHL, OF ELBERFELD, GERMANY, ASSIGNOR TO FARBENFABRIKEN VORM. FRIEDR. BAYER AND CO., OF LEVERKUSEN, NEAR COLOGNE-ON-THE-RHINE, GERMANY.

COMPLEX SODIUM BISMUTH SALT OF TRIGLYCOLLAMIC ACID.

No Drawing. Application filed October 17, 1924. Serial No. 744,266.

*To all whom it may concern:*

Be it known that I, HANS HAHL, a citizen of Germany, residing at Elberfeld, in the State of Prussia, Germany, have invented new and useful Improvements in Complex Sodium Bismuth Salt of Triglycollamic Acid, of which the following is a specification.

The present invention concerns the production of a hitherto unknown compound of bismuth with triglycollamic acid. It is a whitish powder soluble in water to a neutral solution. It contains about 20 per cent of bismuth and has proved to be a valuable remedy against syphilis.

In order to illustrate the new invention the following example is given:—

20 parts by weight of triglycollamic acid of the formula $N(CH_2-COOH)_3$, and 5,5 parts by weight of dried sodium carbonate are admixed to 50 parts by weight of water and 5 parts by weight of bismuth oxide BiOOH and the mixture is heated until all will be dissolved. The alkaline liquid is filtered, neutralized with triglycollamic acid and evaporated to dryness. The complex sodium bismuth salt of the triglycollamic acid is thus obtained. It has most probably the formula:

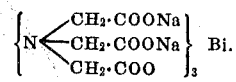

I claim:—

The herein described new complex sodium bismuth salt of triglycollamic acid having most probably the formula:

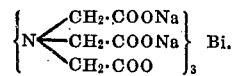

and being a whitish amorphous compound containing about 20 per cent bismuth soluble in water with a neutral reaction.

In testimony whereof I have hereunto set my hand.

HANS HAHL.